M. ROCKSTROH.
BELT CONTROLLING MEANS.
APPLICATION FILED JULY 18, 1910.
993,317.
Patented May 23, 1911.
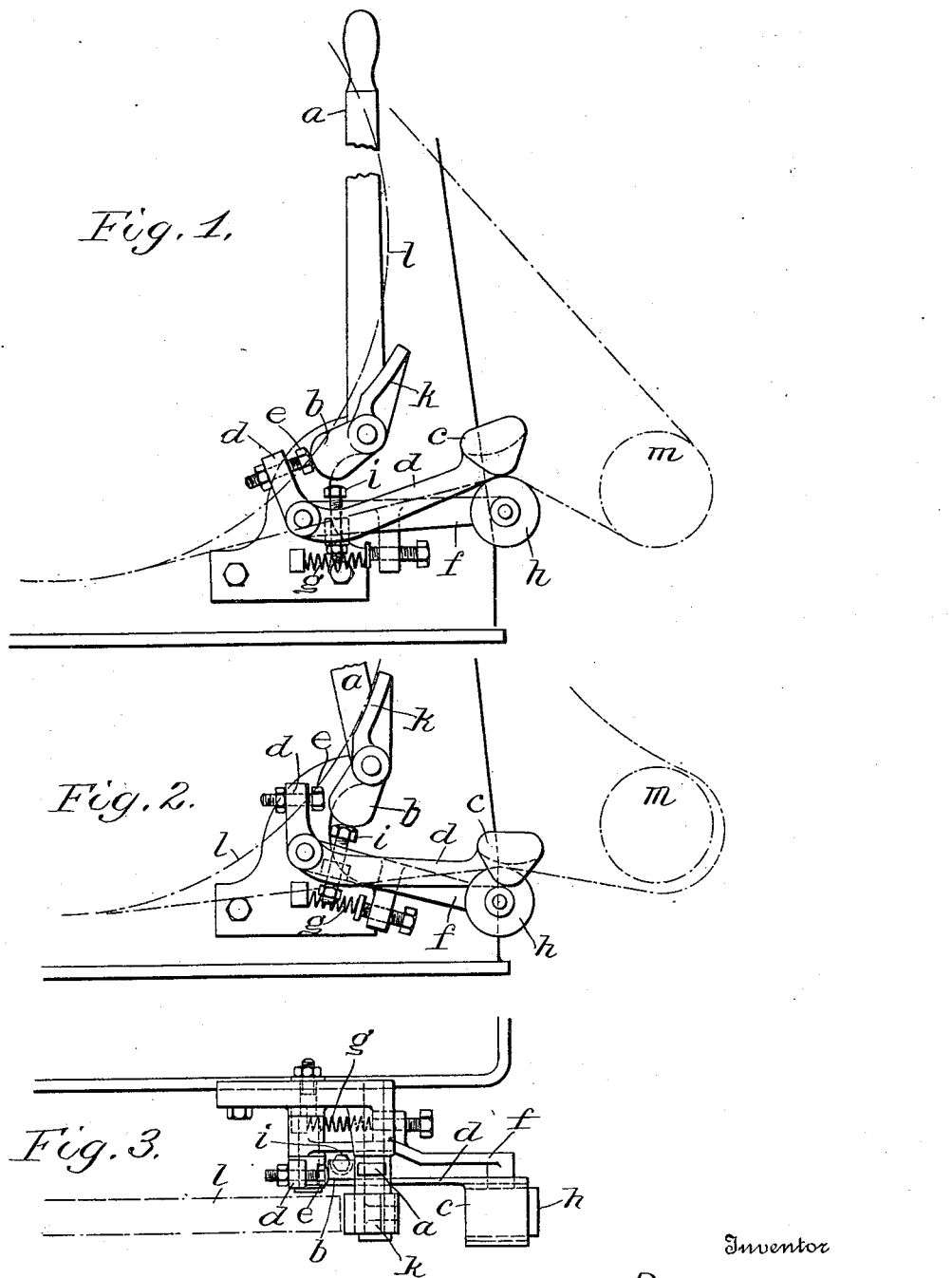
Witnesses
M. Hefling
D. E. Burdine
Inventor
Max Rockstroh,
By P. Singer,
Attorney

UNITED STATES PATENT OFFICE.

MAX ROCKSTROH, OF KLEIN-SEDLITZ, NEAR PIRNA, GERMANY.

BELT-CONTROLLING MEANS.

993,317. Specification of Letters Patent. Patented May 23, 1911.

Application filed July 18, 1910. Serial No. 572,654.

*To all whom it may concern:*

Be it known that I, MAX ROCKSTROH, a citizen of the Kingdom of Saxony, residing at Villa Lützow, Klein-Sedlitz, near Pirna-on-the-Elbe, Germany, have invented certain new and useful Improvements in Belt-Controlling Means, of which the following is a specification.

This invention relates to a controlling device especially applicable for use with electrically operated printing and stamping presses. In the known driving devices the electro-motor was switched out when the machine was put out of operation. The necessary connection between the brake and regulating resistance was inconvenient and expensive in construction, besides this it was impracticable for alternating current plants as all alternating current motors do not drive when under a load. Also the controller for a motor mounted on a so-called jack is complicated and expensive.

The device according to this invention is in consequence of its simple construction exceedingly cheap and is adapted for use with small and cheap machines.

It is unnecessary according to this invention to provide a special jack or foundation for the motor as it is sufficient to mount the motor directly by the side of the machine on the ground so that the belt from the flywheel has only a short distance to traverse in order to pass around the belt pulley of the motor. The regulating resistance or starter can be switched out independently of bringing the motor into and out of operation as this is only necessary when there is a long interruption.

In the accompanying drawing Figure 1 shows a side elevation of the device in the operative position and Fig. 2 in the inoperative position and Fig. 3 is a plan of Fig. 2.

The controlling lever $a$ is provided with a cam surface $b$ and a brake block $k$. Below the cam is rotatably mounted a weighted bell crank lever $d$ of which one end is provided with a set screw $e$, while the weighted end $c$ is above the roller $h$ of the tension lever $f$. The tension lever $f$ is also provided with a set screw $i$ which similarly to the set screw $e$ of the lever $d$ projects into the path of the cam end $b$ of the controlling lever $a$. The tension lever $f$ is under the action of a spring $g$ which tends to raise the roller $h$ and thus tension the belt.

$l$ is the fly-wheel.

The operation is as follows: In the operative position corresponding to Fig. 1 the cam $b$ rests against the set screw $e$ of the weighted bell crank lever $d$ and raises this latter so that the tension lever $f$ is raised by the spring $g$ and thus tensions the belt which passes over the motor pulley $m$ and the fly-wheel $l$. When in the inoperative position according to Fig. 2 the cam $b$ presses upon the set screw $i$ of the tension lever $f$ thus depressing the latter so that the set screw $e$ of the weighted lever is released from the cam $b$, and the weight $c$ of the lever $d$ rests upon the roller $h$ and brakes the belt. In this manner any slackness of the lower part of the belt is obviated and the part of the belt surrounding the still rotating motor pulley $m$ is loose so that it is prevented from becoming hot. When in the inoperative position the brake block $k$ provided on the controlling lever $a$ rests against the fly-wheel thus braking the movement thereof.

Having now particularly described and ascertained the nature of my said invention and in what manner the same is to be performed, I declare that what I claim is:

1. The combination with pulleys and a belt loosely trained thereon, of a belt controller therefor comprising a pivotally mounted lever, a brake shoe adapted for actuation by said lever against one of said pulleys at a point between the laps of the belt thereon, a cam actuated by said lever, a spring controlled lever normally acting to tighten the belt and engaging the outside face thereof and provided with an adjustable portion lying in the path of said cam, and a belt braking lever having an adjustable portion lying in the path of said cam and having a weighted end engaging the inside face of the belt at a point opposite the point of engagement therewith by said spring controlled lever.

2. The combination with pulleys and a belt loosely trained thereon, of a belt controller therefor comprising a pivotally mounted lever, a brake shoe adapted for actuation by said member against one of said pulleys, a cam actuated by said lever, a spring controlled lever normally acting to tighten the belt and engaging the same on one face thereof between said pulleys, said lever having a portion lying in the path of said cam, and a belt braking lever having a portion lying in the path of said cam and mounted to fall by gravity into engagement with an opposite face of the belt at a point adjacent the engagement of the belt by said first named lever.

3. The combination with pulleys and a belt loosely trained thereon, of a belt controller therefor comprising a pivotally mounted lever, a cam actuated by said lever, a spring controlled lever normally acting to tighten the belt and engaging one face thereof and provided with a portion lying in the path of said cam, and a belt braking lever having a portion lying in the path of said cam and mounted to act by gravity on the belt at a point opposite the engagement therewith by said spring controlled lever.

4. The combination with pulleys and a belt loosely trained about said pulleys, of a belt controller comprising a pivoted lever and a cam actuated thereby and movable about the pivot of said lever as its center, a spring actuated device normally acting to tighten the belt, and a belt braking device for engagement with the belt, said devices having portions arranged to be alternately acted upon by said cam.

5. The combination with pulleys and a belt loosely trained about said pulleys, of a belt controller comprising a lever and a cam actuated thereby, a spring actuated device normally acting to tighten the belt, and a belt braking device for engagement with the belt, said devices having portions arranged to be alternately acted upon by said cam.

6. The combination with pulleys and a belt loosely trained about said pulleys, of a spring actuated device normally acting to tighten the belt, a belt braking device for engaging the belt to arrest movement of the same, both of said devices acting upon portions of the belt disposed between said pulleys, and controlling means for actuating said devices.

7. The combination with pulleys and a belt loosely trained about said pulleys, of a spring actuated device normally acting to tighten the belt, a braking device for engaging the belt to arrest movement thereof, both of said devices acting on portions of the belt disposed between said pulleys, and controlling means for actuating said devices.

8. The combination with pulleys and a belt loosely trained about said pulleys, of a spring actuated device normally acting to tighten the belt, a braking device for engaging the belt on that side and at a point opposite the engagement therewith by said spring actuated device, and controlling means for actuating said devices.

9. The combination with pulleys and a belt loosely trained about said pulleys, of a device normally acting to tighten the belt, a braking device for engaging the belt to arrest movement thereof, both of said devices acting upon portions of the belt disposed between said pulleys, and controlling means for actuating said devices.

Dated this 7th day of March 1910.

In testimony whereof I have hereunto set my hand in presence of two subscribing witnesses.

MAX ROCKSTROH.

Witnesses:
 PAUL ARRAS,
 CLÄRE SIMON.

---

Copies of this patent may be obtained for five cents each, by addressing the "Commissioner of Patents, Washington, D. C."